(12) United States Patent
Rocca et al.

(10) Patent No.: US 11,472,238 B2
(45) Date of Patent: Oct. 18, 2022

(54) METHOD AND SYSTEM FOR SIGNALING AN AQUAPLANE CONDITION OF A TYRE MOUNTED ON A VEHICLE

(71) Applicant: PIRELLI TYRE S.P.A., Milan (IT)

(72) Inventors: Marco Rocca, Milan (IT); Paolo Giulio Aldo Artesani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 264 days.

(21) Appl. No.: 16/765,835

(22) PCT Filed: Dec. 18, 2018

(86) PCT No.: PCT/IT2018/050250
§ 371 (c)(1),
(2) Date: May 20, 2020

(87) PCT Pub. No.: WO2019/123501
PCT Pub. Date: Jun. 27, 2019

(65) Prior Publication Data
US 2020/0353778 A1    Nov. 12, 2020

(30) Foreign Application Priority Data
Dec. 21, 2017 (IT) .......................... 102017000148612

(51) Int. Cl.
*B60C 19/00* (2006.01)
*G01M 17/02* (2006.01)

(52) U.S. Cl.
CPC ............ *B60C 19/00* (2013.01); *G01M 17/02* (2013.01); *B60C 2019/004* (2013.01)

(58) Field of Classification Search
CPC ... B60C 19/00; B60C 2019/004; G01M 17/02
See application file for complete search history.

(56) References Cited

U.S. PATENT DOCUMENTS

| 5,502,433 A | 3/1996 | Breuer et al. |
| 5,723,768 A | 3/1998 | Ammon |

(Continued)

FOREIGN PATENT DOCUMENTS

| CN | 101281029 A | 10/2008 |
| CN | 102196952 A | 9/2011 |

(Continued)

OTHER PUBLICATIONS

International Search Report for International Application No. PCT/IT2018/050250 filed on Dec. 18, 2018 on behalf of Pirelli Tyre SPA. dated Mar. 26, 2019. 3 pages.

(Continued)

*Primary Examiner* — Natalie Huls
*Assistant Examiner* — Cynthia L Davis
(74) *Attorney, Agent, or Firm* — Steinfl + Bruno LLP

(57) ABSTRACT

Starting from an acceleration signal, representative of a radial acceleration undergone by a portion of a crown region of said tyre due to the rolling of said tyre on a rolling surface, the trend of the first derivative of the radial acceleration is determined at a portion representative of the interaction of the tyre with a water layer. From the trend of the first derivative of the radial acceleration, it is determined at least one first parameter representative of an aquaplane condition of the tyre on the basis of a comparison between a first maximum and a second maximum of the first derivative at the portion representative of the interaction between tyre and water layer.

20 Claims, 6 Drawing Sheets

(56) References Cited

U.S. PATENT DOCUMENTS

| | | |
|---|---|---|
| 2004/0117100 A1 | 6/2004 | Kin |
| 2006/0265114 A1* | 11/2006 | Thumrugoti ............. B60T 8/24 |
| | | 303/121 |
| 2008/0245454 A1 | 10/2008 | Spetler |
| 2008/0245455 A1 | 10/2008 | Spetler |
| 2008/0245456 A1 | 10/2008 | Spetler |
| 2011/0199201 A1* | 8/2011 | Brusarosco ........... B60T 8/1725 |
| | | 340/438 |
| 2015/0153266 A1 | 6/2015 | Mack |
| 2016/0264109 A1 | 9/2016 | Weston |
| 2017/0334254 A1 | 11/2017 | Limbrunner et al. |
| 2020/0056983 A1* | 2/2020 | Masago ............. B60W 40/064 |

FOREIGN PATENT DOCUMENTS

| | | |
|---|---|---|
| CN | 104691550 A | 6/2015 |
| DE | 102014226783 A1 | 6/2016 |
| KR | 100726999 B1 | 6/2007 |
| WO | 2010/046871 A1 | 4/2010 |
| WO | 2015/019283 A1 | 2/2015 |
| WO | 2015/019288 A1 | 2/2015 |

OTHER PUBLICATIONS

Written Ooinion for International Apolication No. PCT.IT2018/050250 filed on Dec. 18, 2018 on behalf of Pirelli Tyre SPA. dated Mar. 26, 2019. 5 pages.
Chinese Office Action for CN Application No. 201880078747.5 filed on Dec. 18, 2020 on behalf of Pirelli Tyre S.P.A. dated Apr. 6, 2021. 7 Pages. CN Original + Partial English Translation.

\* cited by examiner

METHOD AND SYSTEM FOR SIGNALING AN AQUAPLANE CONDITION OF A TYRE MOUNTED ON A VEHICLE

CROSS REFERENCE TO RELATED APPLICATIONS

The present application is the U.S. National Stage of International Patent Application No. PCT/IT2018/050250 filed on Dec. 18, 2018 which, in turn, claims priority to Italian Application No. IT 102017000148612 filed on Dec. 21, 2017.

FIELD OF THE INVENTION

The present invention refers to a method and a system for signalling an aquaplane condition of a tyre mounted on a vehicle. The present invention also refers to a method for controlling a vehicle. The present invention also refers to a vehicle comprising a system for signalling an aquaplane condition.

STATE OF ART

In this context, by aquaplane it is meant the condition in which a tyre loses directionality due to the presence of a water layer between the tyre and the ground (or, more generally, the tyre's rolling surface), so that, even if the driver of the vehicle on which the tyre is mounted tries to change the trajectory of the vehicle itself, the tyre continues according to the direction substantially imposed by inertia without changing its trajectory.

The condition of aquaplane occurs when the drainage and expulsion of water in the channels and/or in the grooves of the tread, at the footprint region, becomes insufficient, so that the tyre loses adherence.

There is therefore a lift of the tyre from the ground at the footprint region, and the consequent loss of directionality and traction by the tyre itself.

More specifically, in the presence of significant water layers, the tyre tends to deform with respect to a condition of normal interaction between the tyre and the rolling surface.

This deformation causes in particular a reduction of the area in the footprint region, and a consequent reduction of the adhesion between the tyre and the rolling surface.

The phenomenon of aquaplane can be extremely dangerous, because in such conditions the driver can substantially lose control of the vehicle, and he is no longer able to follow the road, avoid obstacles, etc.

Documents WO2010/046871, U.S. Pat. Nos. 5,502,433, 5,723,768, US2008/0245455, US2008/0245456, US2016/0264109 refer to method/system for detecting aquaplane conditions of a tyre.

SUMMARY OF THE INVENTION

The Applicant has verified that the occurrence of the aquaplane phenomenon is difficult to detect in the presence of thin water layers (e.g. 1-3 mm). In these conditions the deformation undergone by the tyre with respect to its running condition on a dry surface is not perceptible even with sensors arranged in the crown portion of the tyre. The methods described in the aforesaid documents therefore have a limit in detecting the occurrence of the aquaplane phenomenon, which does not allow to adjust or activate a vehicle control system sufficiently in advance (for example, a system of stability control).

However, the Applicant has found that it is possible to detect the occurrence of the aquaplane phenomenon even with thin water layers by means of a specific analysis of a signal emitted by an accelerometric sensor arranged in the crown portion of the tyre.

According to a first aspect, the invention relates to a method for signalling an aquaplane condition of a tyre mounted on a vehicle According to a second aspect, the invention relates to a method for controlling a vehicle equipped with tyres.

According to a third aspect, the invention relates to a system for signalling an aquaplane condition of a tyre mounted on a vehicle.

According to a fourth aspect, the invention relates to a vehicle equipped with tyres.

For the purposes of the present invention, by "aquaplane condition" of a tyre it is meant a condition in which the tyre loses adhesion, at least partially, due to the presence of the water layer on which it passes. The aquaplane condition can be partial or total (or full aquaplane): in the latter case, the tyre loses completely directionality, while in the first case the tyre retains at least part of the footprint area in contact with the rolling surface and therefore maintains at least in part the ability to interact with the rolling surface itself.

The present invention in one or more of aforesaid aspects may present one or more of the following preferred features.

The vehicle is operated to cause the tyre to roll on a rolling surface, said rolling surface comprising a water layer.

Preferably it is provided to obtain an acceleration signal, representative of a radial acceleration undergone by a portion of a crown zone of said tyre due to the rolling of said tyre on said rolling surface. The acceleration signal comprises at least a portion representative of an interaction between said tyre and said water layer.

Preferably it is provided to process said acceleration signal to determine a trend of a first derivative of said radial acceleration at said portion representative of said interaction.

Preferably it is provided to determine at least a first parameter representative of an aquaplane condition of said tyre on the basis of a comparison between a first maximum and a second maximum of said first derivative at said portion representative of said interaction.

Preferably it is provided to generate a notification signal of said aquaplane condition as a function of said at least a first parameter.

Preferably it is provided a sensing device fixed to a portion of a crown zone of said tyre. The sensing device comprises an accelerometer suitable for measuring a radial acceleration undergone by said portion of crown zone when said tyre rolls on a rolling surface.

Preferably it is provided at least a processing module programmed to process an acceleration signal representative of said radial acceleration.

Preferably said at least a processing module is programmed to process said acceleration signal to determine a portion of said acceleration signal representative of an interaction between said tyre and a water layer placed on said rolling surface.

Preferably said at least a processing module is programmed to process said acceleration signal to determine a trend of a first derivative of said radial acceleration.

Preferably said at least a processing module is programmed to process said acceleration signal to determine at least a first parameter representative of an aquaplane condition of said tyre on the basis of a comparison between a first maximum and a second maximum of said first derivative at said portion representative of said interaction.

Preferably it is provided at least a notification module suitable for generating a notification signal of said aquaplane condition as a function of said at least a first parameter.

Preferably the processing of said acceleration signal can comprise filtering said acceleration signal at a frequency lower than a predetermined frequency to generate a filtered acceleration signal.

Alternatively, the processing of said acceleration signal can comprise selecting from a harmonic decomposition of said acceleration signal a portion of harmonics of order lower than a predetermined threshold of harmonics.

The processing of said acceleration signal can also comprise generating a filtered acceleration signal through a harmonic composition of said selected portion of harmonics.

Preferably the processing of said acceleration signal can comprise calculating a gradient of said filtered acceleration signal to determine said trend of said first derivative.

Preferably it can be further provided to compare said at least a first parameter with one or more predetermined thresholds, and to generate said notification signal on the basis of the comparison between said at least a first parameter and said one or more predetermined thresholds.

Preferably the determination of said at least a first parameter comprises identifying a position of an absolute minimum of said trend of said first derivative at said portion representative of the interaction between tyre and water layer.

Preferably the determination of said at least a first parameter comprises identifying said first and second maximum as the two maxima immediately preceding said position of said absolute minimum of said first derivative at said portion representative of the interaction between tyre and water layer.

Preferably it is further provided to process said acceleration signal to determine at least a second parameter representative of an average of said radial acceleration in said at least a portion representative of the interaction between said tyre and said water layer.

Said notification signal of said aquaplane condition can be generated as a function of said at least a second parameter.

Preferably said at least a processing module can be further programmed to filter said acceleration signal at a frequency lower than a predetermined frequency to generate a filtered acceleration signal.

Alternatively, said at least a processing module can be further programmed to process said acceleration signal for:
 selecting from a harmonic decomposition of said acceleration signal a portion of harmonics of order lower than a predetermined threshold of harmonics;
 generating a filtered acceleration signal through a harmonic composition of said selected portion of harmonics.

Preferably said at least a processing module can be further programmed to calculate a gradient of said filtered acceleration signal to determine said trend of said first derivative.

Preferably said at least a processing module can be further programmed to compare said at least a first parameter with one or more predetermined thresholds.

Preferably said at least a notification module is suitable for generating said notification signal on the basis of the comparison between said at least a first parameter and said one or more predetermined thresholds.

Preferably said at least a processing module can be further programmed to determine said at least a first parameter by identifying a position of an absolute minimum of said trend of said first derivative at said portion representative of the interaction between tyre and water layer.

Preferably said at least a processing module is programmed to determine said at least a first parameter by identifying said first and second maximum as the two maxima immediately preceding said position of said absolute minimum of said first derivative at said portion representative of the interaction between tyre and water layer.

Preferably said at least a processing module is further programmed to determine at least a second parameter representative of an average of said radial acceleration in said at least a portion representative of the interaction between said tyre and said water layer.

Preferably said at least a notification module is further suitable for generating said notification signal of said aquaplane condition as a function of said at least a second parameter.

Preferably the method for controlling a vehicle equipped with tyres comprises receiving a notification of an aquaplane condition generated according to what described above.

Preferably it is provided to activate at least a vehicle control system on the basis of the notification signal.

Preferably the vehicle comprises a system for signalling an aquaplane condition of one or more of said tyres according to what described above.

Preferably the vehicle comprises at least a vehicle control system.

Preferably the vehicle comprises at least a receiving module suitable for receiving said notification signal of an aquaplane condition.

Preferably the vehicle comprises at least an actuation module configured to activate the vehicle control system on the basis of said notification signal.

Preferably said at least a vehicle control system comprises a stability control system of said vehicle and/or a traction control system of said vehicle.

BRIEF DESCRIPTION OF THE DRAWINGS

Further features and advantages will be clearer from the detailed description of some non-limiting examples of the invention.

This description is provided below with reference to the attached figures, which are also purely illustrative and therefore not limiting, in which.

DETAILED DESCRIPTION OF EXAMPLES OF THE INVENTION

Figure 1:
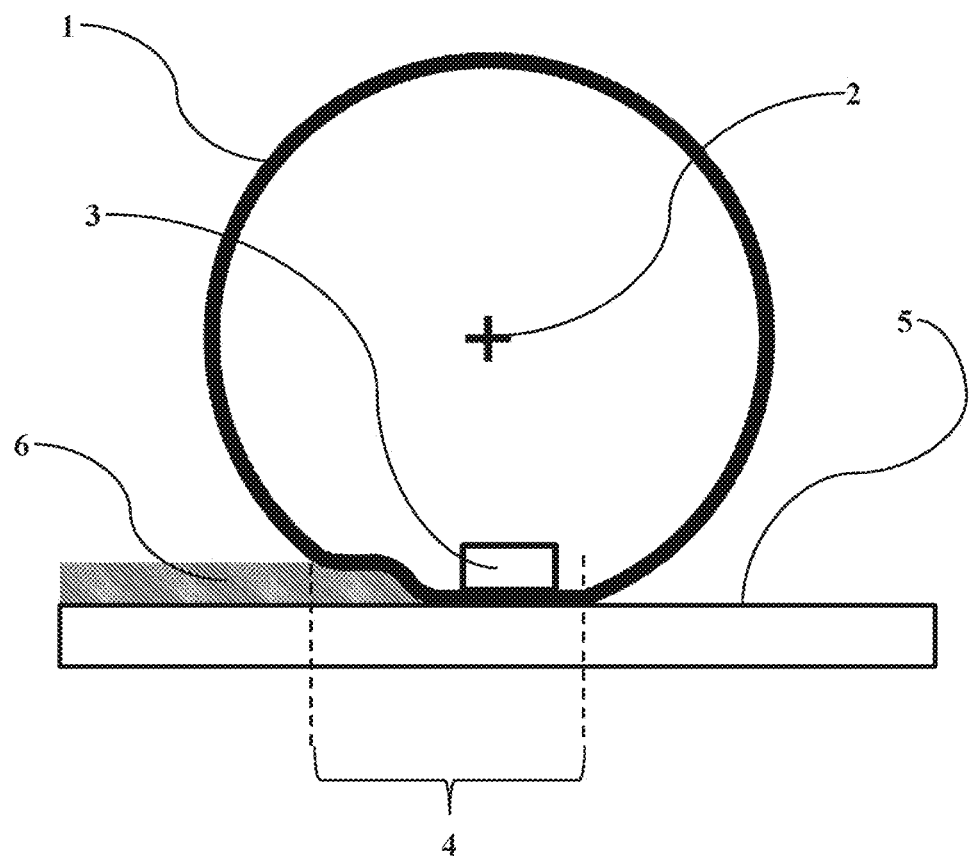
FIG. 1 schematically shows a tyre that is rolling on a rolling surface comprising a water layer.

With reference to FIG. 1, number 1 indicates globally a tyre for vehicle wheels.

Tyre 1 is mounted on a rim (not shown), in turn mounted on a hub 2; by means of the hub 2, the tyre 1 is mounted on a vehicle (not shown) to allow movement of the vehicle itself. A sensing device 3 is fixed on a portion of a crown zone of the inner surface of the tyre 1, comprising an accelerometer suitable for measuring a radial acceleration undergone by the crown portion of tyre 1 to which the sensing device 3 is fixed during rolling of the tyre 1. The sensing device 3 is capable of generating a signal comprising the accelerometric raw data measured by the accelerometer.

In particular, the sensing device 3 can be fixed to the liner of the tyre 1, typically by means of an anchoring device glued to the inner surface of the tyre 1 (e.g. by a structural adhesive in cyanoacrylate or by a pressure-sensitive adhesive). For example, the anchoring device can be made as described in the patent applications WO 2015/019283 and WO 2015/019288 in the name of the same Applicant. Preferably, the sensing device 3 can be substantially fixed at the equatorial plane of the tyre 1. Further sensing devices can be arranged in a more lateral position on the inner surface of tyre 1, and/or at different angular positions along the inner circumference of the tyre 1.

During the movement of the vehicle, tyre 1, rolling on the rolling surface 5 (for example, the ground), undergone a movement along a longitudinal direction substantially parallel to the rolling surface 5 itself.

The tyre 1 is in contact with the rolling surface 5 in the so-called footprint area 4.

Between the tyre 1 and the rolling surface 5 it is interposed a water layer 6 placed on the rolling surface 5.

As schematically shown in FIG. 1, due to the presence of the water layer 6, the tyre 1 may decrease its adhesion to the ground (i.e. decrease its contact area with the rolling surface) and it may happen the onset aquaplane phenomenon. In particular, the wedge of the water layer 6 under the tyre 1 causes a deformation of the tyre 1 resulting in a reduction of the contact area in the footprint region 4.

The interaction between the tyre 1 and the water layer 6 causes at least a partial lifting of the tyre 1, so that the portion of the footprint region 4 in contact with the rolling surface is reduced (partial aquaplane condition), with partial loss of adhesion. In even more critical conditions, the water layer 6 can wedge completely under the tyre 1, which is thus "floating" on the water layer 6 without any direct contact with the rolling surface 5 (full aquaplane condition), and with consequent total loss of adhesion. Under these conditions, the vehicle can completely lose directional capacity of the steering wheels, and/or traction capacity of the tractor wheels, and/or braking capacity.

The onset of the aquaplane phenomenon may depend, for a given tyre, on the thickness of the water layer 6 and/or on the rotational speed of the tyre 1.

The accelerometer comprised in the sensing device 3 allows to measure the deformation undergone by the tyre 1 as a result of both the generation of the footprint region 4, and of the interaction, within the footprint region 4 itself, between the tyre 1 and the water layer 6. In other words, the signal emitted by the sensing device 3, comprising the accelerometric data detected by the accelerometer, comprises a portion representative of the footprint region 4 and, within the latter, a portion representative of the interaction between the tyre 1 and the water layer 6.

Figure 2:
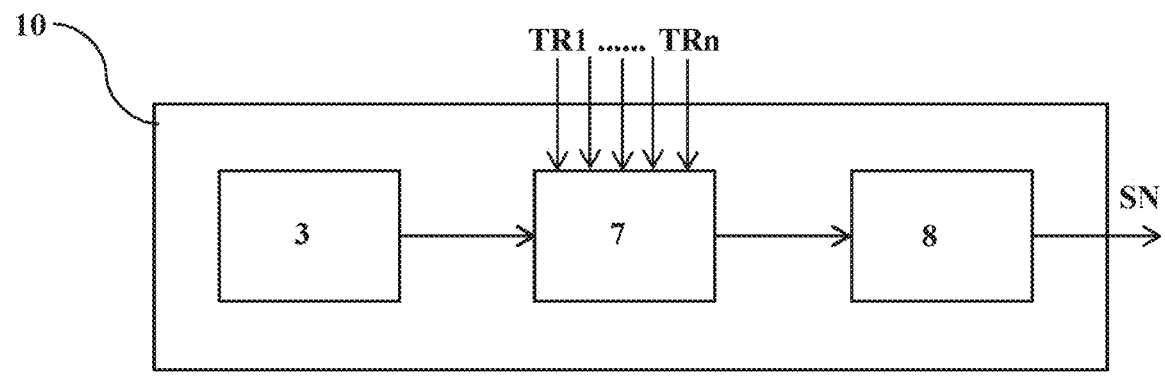
FIG. 2 shows a simplified block diagram of a realization form of a system for signalling an aquaplane condition according to the present invention.

With reference to FIG. 2, the sensing device 3 is comprised in a system 10 to signal an aquaplane condition of a tyre.

The system 10 comprises a processing module 7, operationally connected to the sensing device 3. The processing module 7 may be arranged inside the tyre, or it may be arranged on the vehicle and may be able to receive, by wireless transmission, the signal generated by the sensing device 3 which comprises the accelerometric data necessary for the processing. Alternatively, a first part of the processing of the signal comprising the accelerometric data, can be performed in a first processing module placed inside the tyre and preferably integrated with the sensing device 3; a second part of the elaboration can be performed by a second processing module placed on the vehicle, and which is capable of receiving by wireless transmission the data necessary for the second part of the signal processing and processed by the first processing module.

The processing module 7 is programmed to process the signal comprising the accelerometric data detected by the sensing device 3, in order to determine one or more parameters representive of an aquaplane condition of the tyre to which it is associated the sensing device 3. In particular, the processing module 7 is programmed to perform a gradient operation on the accelerometric signal, in order to obtain a trend of the first derivative of the accelerometric signal.

In more detail, the processing module 7 can preferably be programmed to perform this gradient operation on a low frequency filtered accelerometric signal.

In particular, by means of a low frequency filtering and/or by an analysis of the lower order harmonics of the accelerometric signal, it is possible to monitor the so-called "macrodeformation" of the tyre (or of the tyre liner), i.e. the deformation caused by the compression of the tyre in the region around the footprint region, and how it changes due to the passage of the tyre on the water layer. In other words, the low frequency filtering allows to obtain a filtered accelerometric signal in which the signal portion, representative of the deformation undergone by the tyre as a result of the interaction between the tyre and a water layer, is clearly recognizable.

In an embodiment, the processing module 7 can be programmed to filter the accelerometric signal with a low pass filter tuned at a preset frequency (e.g. less than 700 Hz). In a preferred alternative embodiment, the processing module 7 is programmed to obtain the filtered accelerometric signal by means of a harmonic decomposition (e.g. made by Fourier transform) of the accelerometric raw signal, and subsequent recomposition of the only harmonics of order lower than a predetermined threshold. For example, since the harmonic decomposition of a radial accelerometric signal typically comprises an absolute maximum for a portion of harmonics close to the first harmonic, this threshold can be fixed in order to comprise the portion of harmonics which goes from one up to an harmonic with order subsequent to, but not far from, the harmonic corresponding to the absolute maximum (for example, the harmonic with an offset of 10-50% with respect to the harmonic corresponding to the absolute maximum, or the harmonic corresponding to a height equal to 10-50% with respect to the height of the absolute maximum).

In order to determine the parameter or parameters representative of the possible aquaplane condition of the tyre, the processing module may use one or more thresholds TR1 . . . TRn.

The system 10 also comprises a notification module 8, connected to the processing module 7. The notification module 8 receives the parameter or parameters determined by the processing module 7 and it is suitable to generate a notification signal SN of the aquaplane condition as a function of this parameter or of these parameters. This notification signal SN may be addressed to the driver of the vehicle, to provide a warning about any possible dangerous conditions in which the vehicle itself can be due to the onset of the aquaplane phenomenon.

In addition or alternatively, the notification signal SN can be addressed to an automatic vehicle control system (not shown), to activate automatic driving assistance actuators in order to prevent the vehicle from being in a condition too close with respect to the aquaplane one. For example, this control system may comprise a stability control system (electronic stability control or ESC, electronic stability program or ESP, etc.), and the activation, controlled by the notification signal SN, may reduce the speed of the vehicle. In another example, the control system can comprise a traction control system, and the activation controlled by the notification signal SN can operate a reduction of the engine power and/or of the traction torque impressed to the tractor wheel hubs.

In a feasible embodiment, the sensing device 3 is fixed on the liner of a tyre, while the processing module 7 and the notification module 8 are implemented in a control unit mounted on board the vehicle.

The sensing device 3 comprises an accelerometer capable of measuring acceleration along a radial direction of the tyre, a firmware module or a hardware module (e.g. an Application Specific Integrated Circuit, or ASIC) capable of receiving/managing the radial acceleration data measured by the accelerometer and capable of arranging them according to a given sampling frequency (typically greater than 2 kHz), a battery (and/or other power generation system) and a wireless transmitter operating in a frequency band between about 1 and 10 GHz (e.g. by Industrial, Scientific and Medical band, or ISM, or by Ultra Wide Base transmission, or UWB).

The control unit on board the vehicle, on which the processing module 7 and the notification module 8 are implemented, comprises a receiver capable of receiving the data sent thorough wireless transmission by the sensing device 3 (and therefore operating according to the same standard and in the same frequency band as the transmitter of the sensing device 3).

The processing module 7 and the notification module 8 are implemented as software modules stored in a memory associated with a CPU. In the same memory can be stored, by appropriate configuration, also the thresholds TR1 . . . TRn.

The Applicant carried out a series of tests fixing, to tyres of different vehicles, sensing devices comprising accelerometers arranged to measure the radial acceleration at which the portion of the crown region of the tyres, to which such devices were associated, was subject during rolling. The devices fixed to the tyres were in wireless connection with a control unit placed on board the vehicle, with processing modules capable of receiving and processing the accelerometric raw signals coming from the sensing devices. The processing modules of the control unit were programmed to perform on the accelerometric raw signals a filtering operation by means of an FFT (Fast Fourier Transform) harmonic decomposition and subsequent recomposition of the only harmonics of order lower than a harmonic arranged in a position corresponding to a height of 20% with respect to the height of the absolute maximum of the FFT. The processing modules of the control unit were also programmed to perform a gradient operation on the filtered accelerometric signal, in order to obtain the trend of the first derivative of the radial acceleration.

FIGS. 3-9 show some results of the test obtained with tyres P Zero™ 235/40 ZR19 produced by the Applicant and mounted on an Alfa Romeo 159 car. In particular, the figures show the trend of the radial acceleration (continuous curve) and of its first derivative (dashed curve) on half a wheel revolution. The values represented in ordinate numerically correspond to what obtained with radial acceleration, while regarding the first derivative they correspond to values divided by 1000 (so that both curves can be read on the same graph).

Figure 3:
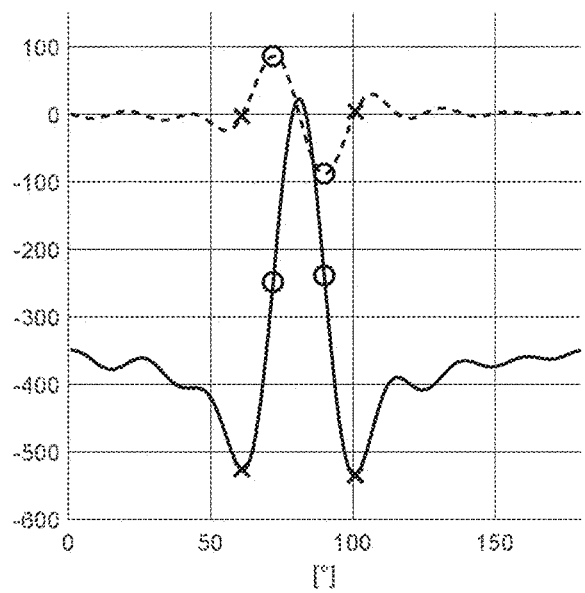
FIG. 3 shows an example of the trend of the radial acceleration and of its first derivative for a tyre rolling on a substantially dry rolling surface.
Figure 4:
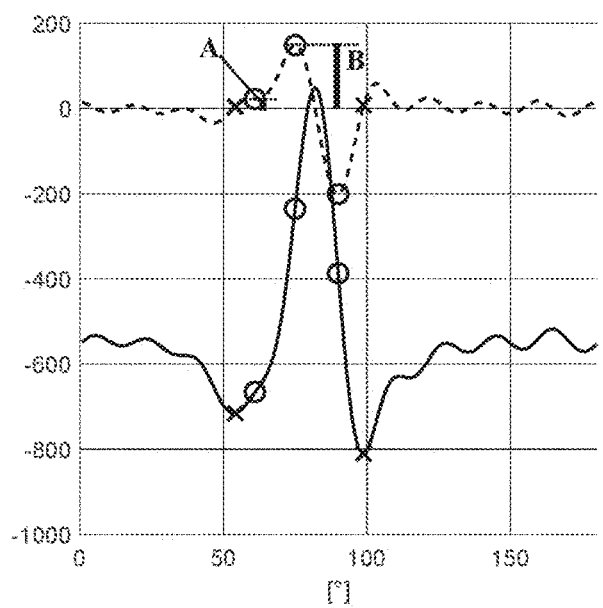
FIGS. 4-9 show some examples of the trend of the radial acceleration and of its first derivative for a tyre rolling on a rolling surface comprising a water layer at progressively increasing speeds, under partial aquaplane conditions.
Figure 5:
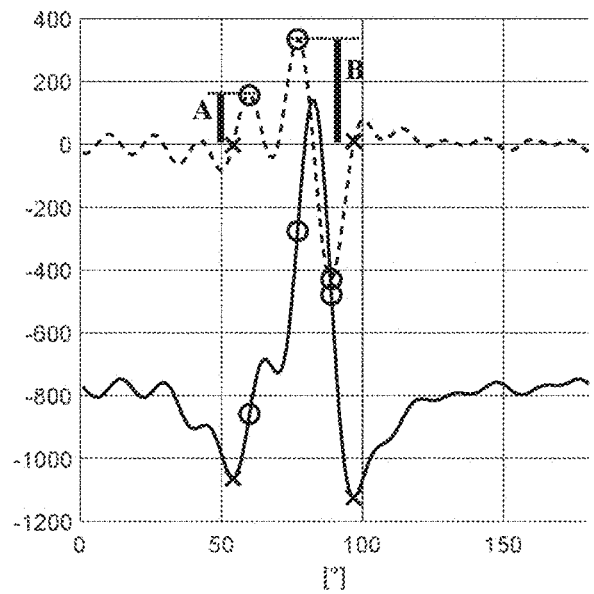
Figure 6:
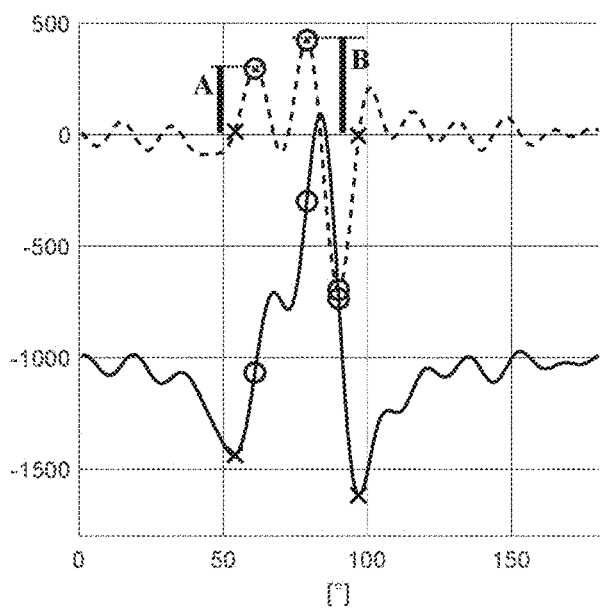
Figure 7:
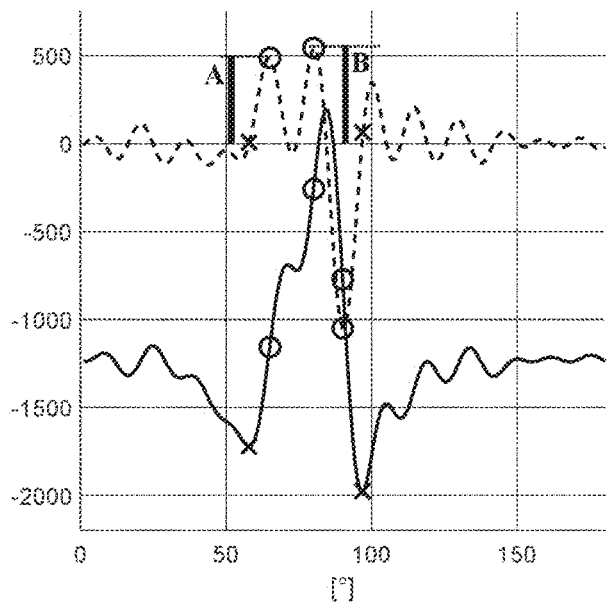
Figure 8:
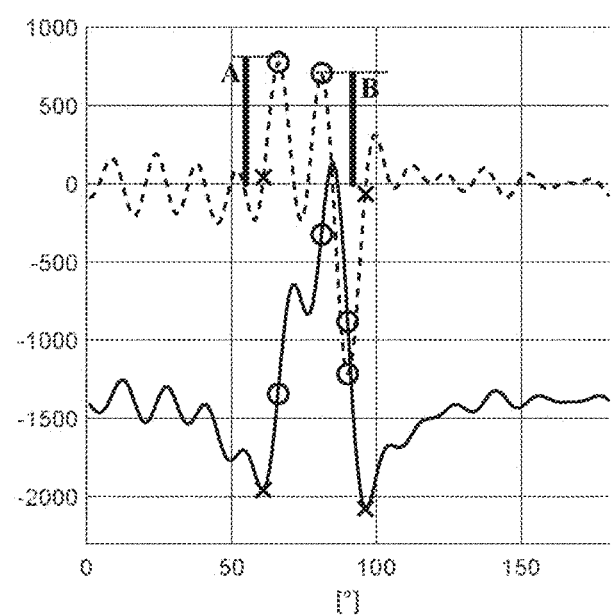
Figure 9:
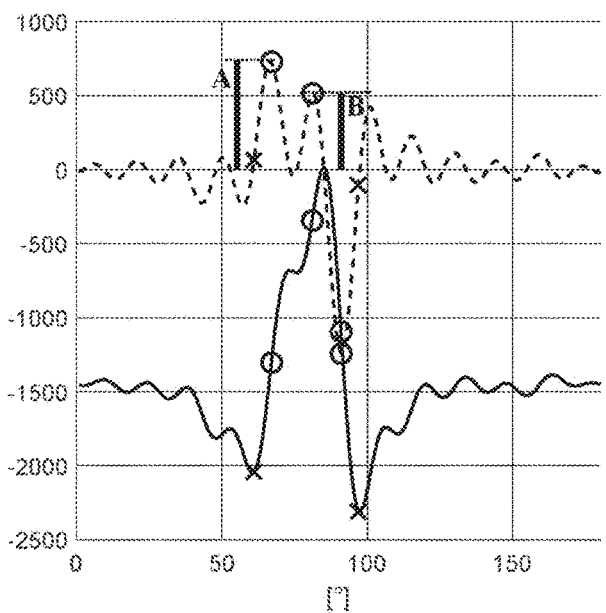

More particularly, FIG. 3 shows the trend of the radial acceleration and of its first derivative on half a wheel revolution on 3 mm water layer at low speed, such that the tyre tread could completely evacuate the water, remaining with all the footprint region on the asphalt; FIGS. 4-9 show the trends of the radial acceleration and of the first derivative of the acceleration, each figure on half a wheel revolution, still on 3 mm water layer, at progressively increasing speeds (FIG. 4—40 km/h; FIG. 5—50 km/h; FIG. 6—60 km/h; FIG. 7—70 km/h; FIG. 8—80 km/h; FIG. 9—85 km/h).

In each figure, "X" symbols identify, both on the radial acceleration curve and on the first derivative curve, the start and end points of the footprint region. These points were obtained by programming the processing modules of the control unit in order to identify the absolute minima of the radial acceleration curve.

In each figure, "O" symbols identify the extrema of the trend of the first derivative which are relevant to the determination of a first parameter representative of the aquaplane condition. These points were obtained by programming the processing modules of the control unit in order to identify, on the first derivative curve: a) the absolute minimum (immediately preceding the exit point from the footprint region); b) the first maximum immediately preceding the absolute minimum; the second maximum immediately preceding the first maximum but within the start point of the footprint region.

For each trend of the first derivative, the processing modules of the control unit have been programmed to determine the height of the first maximum and of the second maximum.

As can be seen from FIG. 3, corresponding to a motion on dry surface, the first derivative curve of the radial acceleration has only one maximum within the portion corresponding to the footprint region.

In FIGS. 4-9 instead, on the radial acceleration curve, a portion corresponding to the deformation undergone by the tyre can be recognized due to the interaction with the water layer. Correspondingly, two maxima appear on the curve of the first derivative which change their relative heights (indicated with A, B in the figures) as speed increases. In particular, as the speed increases, the second maximum increase its intensity, until it exceeds the first maximum height in FIGS. 8 and 9.

On the basis of these observations, the Applicant has understood that by comparing the heights of the maxima, of the first derivative of the radial acceleration, which are in the portion of the curve corresponding to the footprint region, it is possible to obtain a parameter representative of partial aquaplane condition of the tyre, i.e. a higher or lower distance from a condition of travelling on a completely dry surface and/or a higher or lower distance from a condition of travelling in full aquaplane condition.

More particularly, it was provided a first parameter P1 based on the ratio between the heights of the first and second maximum of the first derivative. In order to ensure that to low values of parameter P1 corresponds a level of "low aquaplane", in case the height A of the second maximum is less than the height B of the first maximum, the first parameter P1 is the ratio A/B. Since the attainment of the full aquaplane condition corresponds to an asymptotic condition, beyond which the tyre is completely "floating" on the water layer, in case the height A of the second maximum is greater than or equal to the height B of the first maximum, the parameter P1 corresponds to (N−B/A), wherein N is any fixed number greater than one, and which represents the maximum value attainable by the first parameter P1 (substantially corresponding to the attainment of the full aquaplane condition).

In summary, the processing modules of the control unit have been programmed to calculate a first parameter P1 as follows:

If $A<B: P1=A/B$

If $A \geq B: P1=N-B/A$

The parameter P1 thus calculated can be compared to one or more thresholds TR1 . . . TRN, each corresponding to a "level" of partial aquaplane condition, i.e. an aquaplane condition in which at least part of the footprint region is still in contact with the rolling surface (and not with the water layer present on the rolling surface).

The number and the mutual distance between the thresholds TR1 . . . TRN can be defined according to the needs. The Applicant considers advantageous to define a number of thresholds not less than 3, preferably not greater than 10. These thresholds may be equispaced between each other, or, preferably, not equispaced.

It is noted that the above mathematical formulation of the first parameter P1 is not to be considered limiting of the present invention. Other mathematical formulations based on the comparison of the two maxima of the first derivative of the radial acceleration can be provided equivalently, for example based on the ratio and/or on the difference between their heights.

Returning to FIGS. 1 and 2, starting from the processing of the radial acceleration signal detected by the sensing device 3, fixed to the tyre 1, a full aquaplane condition can also be detected. As mentioned, this condition corresponds to a "floating" of the tyre 1 on the water layer 6.

Figure 10:
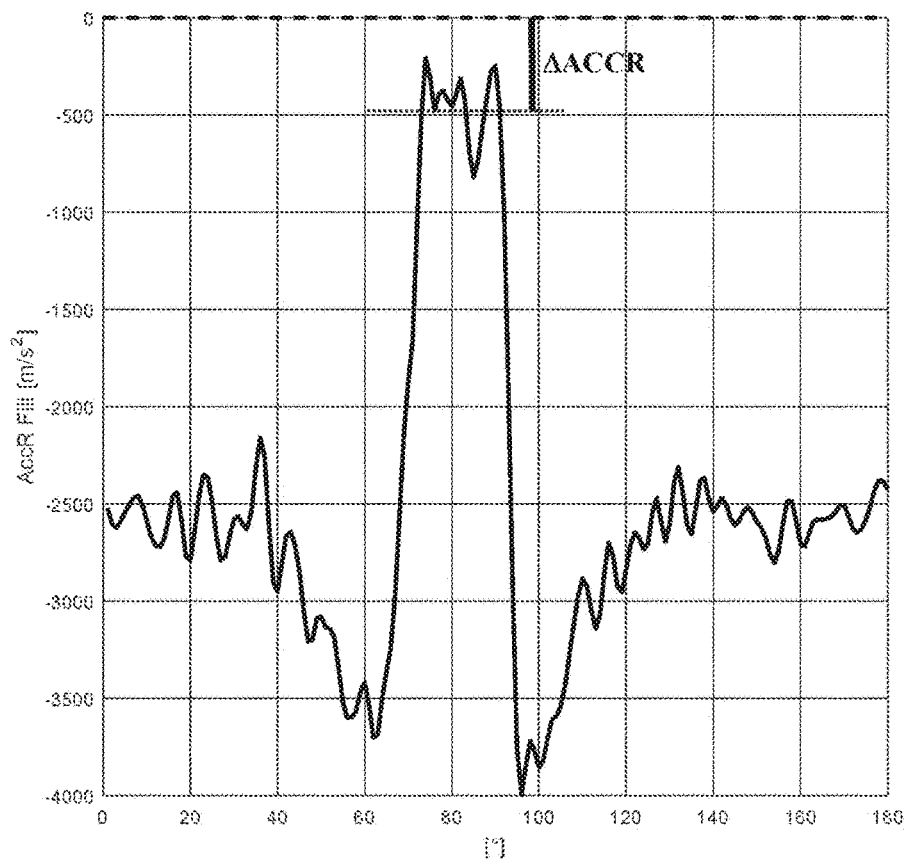
FIG. 10 shows a first example of the trend of the radial acceleration for a tyre rolling on a rolling surface in full aquaplane conditions.
Figure 11:
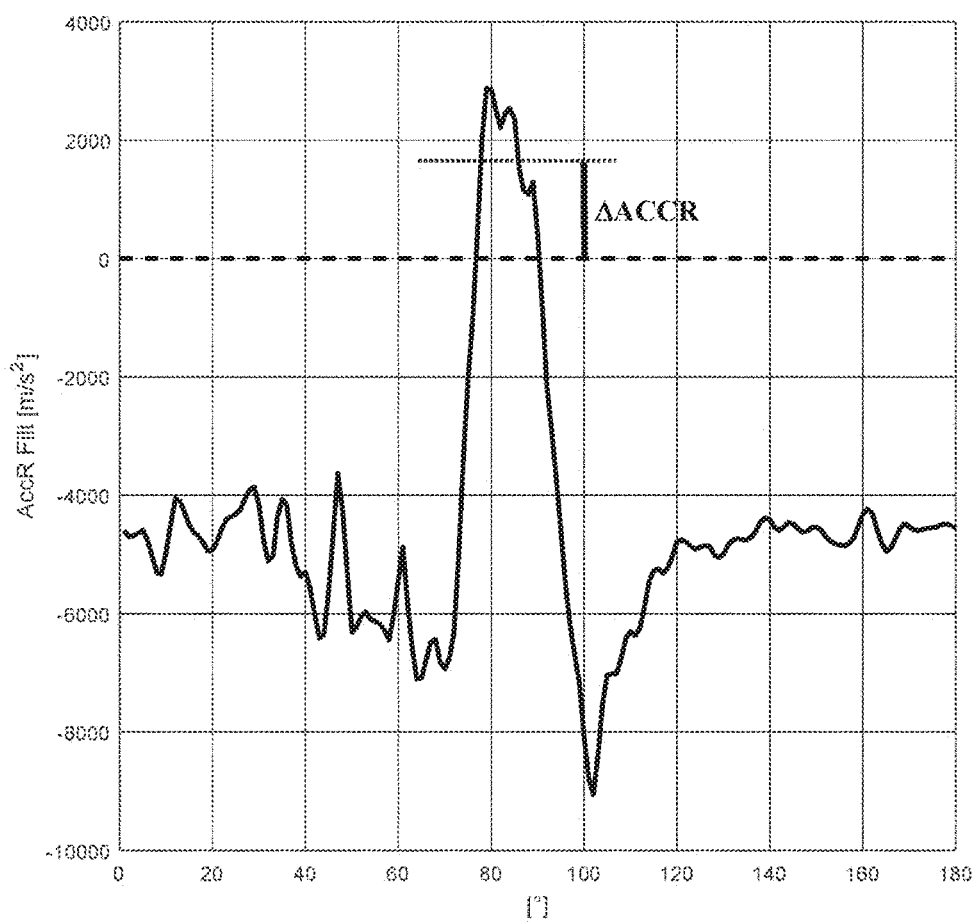
FIG. 11 shows a second example of the trend of the radial acceleration for a tyre rolling on a rolling surface in full aquaplane conditions.

FIGS. 10 and 11 show two examples of raw radial acceleration curves detected during the tests described above, with the used vehicle thrown on a water layer and tyres in full aquaplane conditions. In particular, FIG. 11 corresponds to a test performed at higher speed than the corresponding test represented in FIG. 10. As shown in FIGS. 10 and 11, the radial acceleration in the footprint region does not reach the substantially null value that it is normally reached by radial acceleration in conditions of travel on dry surface or in partial aquaplane condition because of tyre compression. This therefore corresponds to a condition in which the tyre continues to rotate on the water layer, deforming itself, as a result of the interaction with the water layer, in a different way with respect to the normal generation of the footprint region.

The effect visible in FIG. 11, with the acceleration curve that even exceeds the zero in the interaction region, can be explained by a deformation due to the so strong interaction with the water layer that causes a countercurvature of the tyre surface in the interaction region.

The Applicant has devised a second parameter P2 representative of an aquaplane condition of a tyre, based on these observations. In particular, as shown in FIGS. 10 and 11, the second parameter P2 can correspond to an average value $\Delta ACCR$ assumed by the radial acceleration in the signal portion representative of the interaction with the water layer. Preferably, a weighted average is carried out, with decreasing weight starting from the center of the signal portion representative of the interaction, such as a weighted average with decreasing coefficients starting from the center according to a Gaussian curve. This makes it possible to enhance the acceleration values in the innermost part of the interaction region, which is the one most influenced by the water layer presence. The value P2=$\Delta ACCR$ (or its absolute value) can then be compared to a preset threshold in order to distinguish it from the null value that the radial acceleration would assume in case of motion on dry surface (as shown in FIG. 3). In a preferred embodiment, the parameter P2 can be normalized to the mean angular velocity $\omega$ obtained outside the footprint region. For example, it is possible to determine the P2 value as $\Delta ACCR/\omega^2$ (that is a parameter having the physical meaning of a "radius of the deformed portion"). The normalization to the angular velocity allows to obtain a parameter P2 which can be compared with a threshold which does not depend on the rotation speed of the tyre.

In order to determine parameter P2 and the full aquaplane condition, a suitable programming of the processing module 7 of the system 10 can be carried out to indicate an aquaplane condition of the tyre (FIG. 2).

From the appropriate combination of parameters P1 and P2, it is therefore possible to obtain indications relating to the level of aquaplane condition reached by the tyre when it crosses a water layer during the rolling.

For example, if both P1 and P2 parameters are essentially null (i.e. lower, in module, than a respective threshold), it can be concluded that the tyre is rolling on substantially dry surface, or that the tyre tread is operating in order to effectively evacuate substantially all the water on the rolling surface. If parameter P1 is different from zero (i.e. greater, in module, than a threshold), regardless of the value taken by the parameter P2, it can be concluded that the tyre is rolling in partial aquaplane condition, at a higher level the greater the value assumed by the parameter P1. If the parameter P1 is zero or it is substantially null (i.e. less, in module, than a threshold), but the value assumed by P2 is substantially different from zero (i.e. greater, in module, than a threshold), it can be concluded that the tyre is rolling in full aquaplane condition.

As a function of the values assumed by the parameters P1 and P2, it may be chosen by the notification module 8 the most appropriate notification signal SN (FIG. 2) to alert the vehicle driver and/or to activate automatic vehicle control systems.

Finally, it is noted that the system for signalling the aquaplane condition has been described as subdivided in a plurality of modules to pure descriptive purposes, only to clarify the various functionalities; this subdivision does not necessarily reflect the hardware structure of the system for signalling itself. In particular, at least some of the various modules shown in FIG. 2 (e.g. the processing module 7 and the notification module 8) can actually correspond to software routines implemented in the same hardware device, or they can correspond to further fragmented hardware devices.

The invention claimed is:

1. A method for signalling an aquaplane condition of a tyre mounted on a vehicle, comprising, while operating the vehicle:
    obtaining an acceleration signal, representative of a radial acceleration undergone by a portion of a crown zone of said tyre due to the rolling of said tyre on a rolling surface comprising a water layer, said acceleration signal comprising a signal portion representative of an interaction between said tyre and said water layer;

processing said acceleration signal to determine a trend of a first derivative of said radial acceleration, the first derivative comprising a first derivative portion, corresponding to the signal portion, representative of the interaction between said tyre and said water layer;

determining a first parameter representative of an aquaplane condition of said tyre on the basis of a comparison between an amplitude value of a first maximum of said first derivative in said first derivative portion and an amplitude value of a second maximum of said first derivative in said first derivative portion; and generating a notification signal of said aquaplane condition as a function of said first parameter.

2. The method according to claim 1, wherein processing said acceleration signal comprises filtering said acceleration signal at a frequency lower than a set frequency to generate a filtered acceleration signal.

3. The method according to claim 1, wherein processing said acceleration signal comprises:

selecting from a harmonic decomposition of said acceleration signal a portion of harmonics of order lower than a predetermined threshold; and generating a filtered acceleration signal by a harmonic composition of said selected portion of harmonics.

4. The method according to claim 3, wherein processing said acceleration signal comprises calculating a gradient of said filtered acceleration signal to determine said trend of said first derivative.

5. The method according to claim 1, further comprising comparing said first parameter with one or more set thresholds, and generating said notification signal on the basis of the comparison between said first parameter and said one or more set thresholds.

6. The method according to claim 1, wherein determining said first parameter comprises identifying a position of an absolute minimum of said trend of said first derivative in said first derivative portion representative of said interaction.

7. The method according to claim 6, wherein said determining said first parameter comprises identifying said first maximum and said second maximum as two maxima immediately preceding said position of said absolute minimum of said first derivative in said first derivative portion representative of said interaction.

8. The method according to claim 1, further comprising:

processing said acceleration signal to determine a second parameter representative of an average of said radial acceleration in said signal portion representative of the interaction between said tyre and said water layer; and generating said notification signal of said aquaplane condition as a function of said second parameter.

9. A method for controlling a vehicle equipped with tyres, comprising:

receiving a notification signal of an aquaplane condition generated in accordance with the method according to claim 1; and activating at least one vehicle control system on the basis of said notification signal.

10. The method according to claim 9, wherein said at least one vehicle control system comprises at least one of i) a stability control system of said vehicle or ii) a traction control system of said vehicle.

11. A system for signalling an aquaplane condition of a tyre mounted on a vehicle, comprising:

a sensing device fixed to a portion of a crown zone of said tyre, said sensing device comprising an accelerometer suitable for measuring a radial acceleration undergone by said portion of the crown zone when said tyre rolls on a rolling surface;

at least one processing module programmed to process an acceleration signal representative of said radial acceleration to determine:

a) a signal portion of said acceleration signal representative of an interaction between said tyre and a water layer placed on said rolling surface, b) a trend of a first derivative of said radial acceleration, the first derivative comprising a first derivative portion, corresponding to the signal portion, representative of the interaction between said tyre and said water layer, and c) a first parameter representative of an aquaplane condition of said tyre on the basis of a comparison between an amplitude value of a first maximum of said first derivative in said first derivative portion and an amplitude value of a second maximum of said first derivative in said first derivative portion, and a notification module suitable for generating a notification signal of said aquaplane condition as a function of said first parameter.

12. The system according to claim 11, wherein said at least one processing module is further programmed to filter said acceleration signal at a frequency lower than a predetermined frequency to generate a filtered acceleration signal.

13. The system according to claim 11, wherein said at least one processing module is further programmed to process said acceleration signal for:

selecting from a harmonic decomposition of said acceleration signal a portion of harmonics of order lower than a predetermined threshold of harmonics; and generating a filtered acceleration signal through a harmonic composition of said selected portion of harmonics.

14. The system according to claim 13, wherein said at least one processing module is further programmed to calculate a gradient of said filtered acceleration signal to determine said trend of said first derivative.

15. The system according to claim 11, wherein said at least one processing module is further programmed to compare said first parameter with one or more set thresholds, and wherein said notification module is configured for generating said notification signal on the basis of the comparison between said first parameter and said one or more set thresholds.

16. The system according to claim 11, wherein said at least one processing module is further programmed to determine said first parameter by identifying a position of an absolute minimum of said trend of said first derivative in said first derivative portion representative of said interaction.

17. The system according to claim 16, wherein said at least one processing module is programmed to determine said first parameter by identifying said first maximum and said second maximum as two maxima immediately preceding said position of said absolute minimum of said first derivative in said first derivative portion representative of said interaction.

18. The system according to claim 11, wherein said at least one processing module is further programmed to determine a second parameter representative of an average of said radial acceleration in said signal portion representative of the interaction between said tyre and said water layer, and wherein said at least one notification module is further suitable for generating said notification signal of said aquaplane condition as a function of said second parameter.

19. A vehicle equipped with tyres, comprising:
the system according to claim 11;
at least one vehicle control system;
at least one receiving module suitable for receiving said notification signal of an aquaplane condition; and
at least one actuation module configured to activate said at least one vehicle control system on the basis of said notification signal.

20. The vehicle according to claim 19, wherein said at least one vehicle control system comprises at least one of i) a stability control system of said vehicle and ii) a traction control system of said vehicle.

* * * * *